(12) United States Patent
Cooke et al.

(10) Patent No.: US 12,241,430 B2
(45) Date of Patent: Mar. 4, 2025

(54) METHOD AND DEVICE FOR DIAGNOSING A HEATING ELEMENT OF AN EXHAUST GAS SENSOR OF AN INTERNAL COMBUSTION ENGINE

(71) Applicant: Robert Bosch GmbH, Stuttgart (DE)

(72) Inventors: Lukas Cooke, Dresden (DE); Stefan Haller, Filderstadt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 149 days.

(21) Appl. No.: 17/937,970

(22) Filed: Oct. 4, 2022

(65) Prior Publication Data
US 2023/0123607 A1  Apr. 20, 2023

(30) Foreign Application Priority Data
Oct. 15, 2021 (DE) ...................... 10 2021 211 664.7

(51) Int. Cl.
*F02D 41/14* (2006.01)
*F02D 41/22* (2006.01)

(52) U.S. Cl.
CPC ..... *F02D 41/1495* (2013.01); *F02D 41/1401* (2013.01); *F02D 41/1494* (2013.01); *F02D 41/222* (2013.01); *F02D 2041/1433* (2013.01); *F02D 41/1454* (2013.01)

(58) Field of Classification Search
CPC ............. F02D 41/1401; F02D 41/1454; F02D 41/1494; F02D 41/1495; F02D 41/222; F02D 2041/1433
See application file for complete search history.

(56) References Cited

U.S. PATENT DOCUMENTS 9,759,149 B2 * 9/2017 Martin ................ F02D 41/2451

FOREIGN PATENT DOCUMENTS

| DE | 102011002502 A1 | 2/2012 |
|---|---|---|
| DE | 102015224465 A1 | 6/2017 |

* cited by examiner

*Primary Examiner* — Hung Q Nguyen
*Assistant Examiner* — Mark L. Greene
(74) *Attorney, Agent, or Firm* — NORTON ROSE FULBRIGHT US LLP; Gerard A. Messina

(57) ABSTRACT

A method for diagnosing a heating element of an exhaust gas sensor of an internal combustion engine. The exhaust gas sensor includes a temperature measurement device. A modeled temperature at the point of the exhaust gas sensor is continuously ascertained with the aid of a temperature model. The temperature of the exhaust gas sensor is increased by a heating process. The diagnosis of the heating element of the exhaust gas sensor is provided as the result an enable condition. Upon enablement of the diagnosis, a temperature difference between the modeled temperature of the exhaust gas sensor and the measured temperature of the exhaust gas sensor are ascertained. The heating element of the exhaust gas sensor is recognized as defective when the ascertained temperature difference exceeds a predefinable temperature threshold value.

10 Claims, 3 Drawing Sheets

METHOD AND DEVICE FOR DIAGNOSING A HEATING ELEMENT OF AN EXHAUST GAS SENSOR OF AN INTERNAL COMBUSTION ENGINE

CROSS REFERENCE

The present application claims the benefit under 35 U.S.C. § 119 of German Patent Application No. DE 10 2021 211 664.7 filed on Oct. 15, 2021, which is expressly incorporated herein by reference in its entirety.

FIELD

The present invention relates to a method and to a device for diagnosing a heating element of an exhaust gas sensor of an internal combustion engine.

BACKGROUND INFORMATION

The precise setting of the combustion with the aid of exhaust gas sensors is of essential importance for complying with exhaust gas legislation. For lambda exhaust gas sensors, in particular, the legislature requires a robust monitoring of the proper operation of the exhaust gas sensor using a heat output diagnosis.

German Patent Application No. DE 10 2015 224 465 A1 relates to a method and to a device for operating a lambda sensor of an exhaust after-treatment system of an internal combustion engine, a heater being provided for heating the lambda sensor, and it being provided, in particular, that the signal bandwidth of a voltage 300 present at the lambda sensor is evaluated 320, 325 and a functional and/or diagnosable lambda sensor being deduced 330, 335 as the result of the evaluation 320, 325.

German Patent Application No. DE 10 2011 002 502 A1 describes a method for diagnosing an exhaust gas sensor 20, which is situated in the exhaust gas area 16 of an internal combustion engine 10 for detecting at least one exhaust gas component, which is heated with the aid of a sensor heater 22 and the temperature (temp) of which is detected, as well as a device provided for carrying out the method. The approach is characterized in that the exhaust gas sensor 20 is heated to a diagnostic start temperature (temp_setpoint) above the exhaust gas temperature (temp_Abg), in that the sensor heater 22 is completely switched off or the heating power of sensor heater 22 is subsequently reduced at least to the extent that the sensor temperature (temp) may decrease, in that the decreasing sensor temperature (temp) is detected, in that a measure (dtemp/dt) for the temperature drop relative to time is ascertained, in that this measure (dtemp/dt) is compared with an initial temperature gradient threshold value (dSW1), and in that an error signal (F) is provided if the temperature drop is too slow and, accordingly the ascertained measure (dtemp/dt) for the temperature drop relative to time does not exceed the first temperature gradient threshold value (dSW1).

SUMMARY

In one first aspect, the present invention relates to a method for diagnosing a heating element of an exhaust gas sensor of an internal combustion engine, the exhaust gas sensor including a means for temperature measurement. According to an example embodiment of the present invention, a modeled temperature at the point of the exhaust gas sensor is continuously ascertained with the aid of a temperature model. The temperature of the exhaust gas sensor is increased by a heating process. The diagnosis of the heating element of the exhaust gas sensor is provided as the result of an enable condition. Upon enablement of the diagnosis, a temperature difference between the modeled temperature of the exhaust gas sensor and the measured temperature of the exhaust gas sensor is ascertained, the heating element of the exhaust gas sensor being recognized as defective if the ascertained temperature difference exceeds a predefinable temperature threshold value.

The method has the particular advantage that a diagnosis of the heating element of the exhaust gas sensor may be continuously carried out starting from the point in time of the enablement. By using the temperature model for ascertaining a modeled temperature at the point of the exhaust gas sensor, it is possible as a result of the comparison to provide a robust method for diagnosing the heating element of the exhaust gas sensor. As a result of the continuous comparison between the actual ascertained temperature of the exhaust gas sensor and the modeled temperature based on the temperature model of the exhaust gas sensor, it is possible to diagnose a defect or a severe ageing of the heater element of the exhaust gas sensor.

According to an example embodiment of the present invention, it is provided, in particular, that with the start of the heating process, a start temperature is ascertained and the diagnosis is enabled upon exceedance of the start temperature by a predefinable temperature increase. It is particularly advantageous to enable the method only when sufficient thermal energy has been introduced into the system. Thus, it is ensured that the temperature model may be evaluated in a robust manner in order to be able to be subsequently compared with the actual measured temperature of the exhaust gas sensor.

Furthermore, the start temperature may be ascertained in a sensor-based or model-based manner.

According to an example embodiment of the present invention, the diagnosis may further be enabled as a function of a predefinable time period after the start of the heating process.

It is advantageous to enable the method only when sufficient thermal energy has been introduced into the system. Thus, it is ensured that the temperature model may be evaluated in a robust manner in order to be able to be subsequently compared with the actual measured temperature of the exhaust gas sensor.

Alternatively, according to an example embodiment of the present invention, a heat quantity introduced into the exhaust gas system may be ascertained as a function of the modeled temperature, the diagnosis being enabled when the ascertained heat quantity exceeds a predefinable heat quantity. It is particularly advantageous to enable the method only when sufficient thermal energy has been introduced into the system. This may be particularly advantageously ascertained via the heat quantity introduced into the system based on the modeled temperature. Thus, it is ensured that the temperature model may be evaluated in a robust manner in order to be able to be subsequently compared with the actual measured temperature of the exhaust gas sensor.

Furthermore, according to an example embodiment of the present invention, a heat quantity introduced into the exhaust gas system may be ascertained as a function of the ascertained temperature, the diagnosis being enabled when the ascertained heat quantity exceeds a predefinable heat quantity.

According to an example embodiment of the present invention, it is particularly advantageous to enable the method only when sufficient thermal energy has been introduced into the system. This may be particularly advantageously ascertained via the heat quantity introduced into the system based on the sensor-based temperature. Thus, it is ensured that the temperature model may be robustly evaluated in order to be able to be subsequently compared with the actual measured temperature of the exhaust gas sensor.

Alternatively, according to an example embodiment of the present invention, a setpoint temperature for the heating process may be predefined, the diagnosis being enabled when the modulated temperature reaches or exceeds the predefinable setpoint temperature.

Since particular exhaust gas sensors, such as, for example, lambda sensors, are enabled for a measurement only at an operating temperature, it is advantageous after reaching this operating temperature to enable the diagnosis. This is also advantageous, since there are temperature ranges in which a diagnosis of the heater element of the exhaust gas sensor is able to be carried out in a particularly robust manner.

A setpoint temperature for the heating process may further be predefined, the diagnosis being enabled when the instantaneous temperature reaches the predefinable setpoint temperature.

Since particular exhaust gas sensors, such as, for example, lambda sensors, are enabled for a measurement only at an operating temperature, it is advantageous after reaching this operating temperature to enable the diagnosis. This is also advantageous, since there are temperature ranges in which a diagnosis of the heater element of the exhaust gas sensor is able to be carried out in a particularly robust manner.

According to an example embodiment of the present invention, the temperature model of the exhaust gas sensor may be further designed in such a way that the temperature model models an aged exhaust gas sensor at the lower tolerance range. This is particularly advantageous, since a defective exhaust gas sensor is thus able to be diagnosed in a robust manner.

Alternatively, according to an example embodiment of the present invention, the temperature model may be ascertained as a function of a temperature of an intake air, of a battery voltage, of a pulse width-modulated activation ratio for the heater of the exhaust gas sensor, of a wall temperature at the point of the exhaust gas sensor, of an exhaust gas temperature, of a coolant temperature at the output of the internal combustion engine.

The ascertainment of the temperature model is thus able to be carried out on the control unit in a resource-efficient and robust manner.

According to an example embodiment of the present invention, the heating of the exhaust gas sensor may further be carried out with the aid of a heating element integrated into the exhaust gas sensor.

In one second aspect, the present invention relates to a method for diagnosing a heating element of an exhaust gas sensor of an internal combustion engine, the exhaust gas sensor including a means for temperature measurement. According to an example embodiment of the present invention, a modeled temperature is continuously ascertained at the point of the exhaust gas sensor with the aid of a temperature model, a heating power being ascertained as a function of the measured temperature, the temperature of the exhaust gas sensor being increased by a heating process, a heater power and a modeled heater power being ascertained as a function of the temperature model, the diagnosis of the heating element of the exhaust gas sensor being provided as a result of an enable condition, upon enablement of the diagnosis, a power quotient based on the measured heater power of the exhaust gas sensor and the modeled heater power of the exhaust gas sensor being ascertained, the heating element of the exhaust gas sensor being recognized as defective if the ascertained modeled heater power of the exhaust gas senor exceeds a predefinable power threshold value.

The method has the particular advantage that a diagnosis of the heating element of the exhaust gas sensor may be continuously carried out starting from the point in time of the enablement. By using the temperature model for ascertaining a modeled heater power, it is possible to provide as the result of the comparison with the actual adjusted heater power a robust method for diagnosing the heating element of the exhaust gas sensor.

As a result of the continuous comparison between the actual ascertained or adjusted heater power for the exhaust gas sensor and the modeled heater power based on the temperature model of the exhaust gas sensor, it is possible to diagnose a defect or a severe ageing of the heater element of the exhaust gas sensor in a robust manner.

Alternatively, according to an example embodiment of the present invention, a heat quantity introduced into the exhaust gas system may be ascertained as a function of the ascertained temperature, the diagnosis being enabled when the ascertained heat quantity exceeds a predefinable heat quantity. It is advantageous to enable the method only when sufficient thermal energy has been introduced into the system. Thus, it is ensured that the temperature model and the resulting modeled heater power are able to be evaluated in a robust manner in order to be able to be subsequently compared with the actual measured heater power for the exhaust gas sensor.

Furthermore, according to an example embodiment of the present invention, a heat quantity introduced into the exhaust gas system may be ascertained as a function of the modeled temperature, the diagnosis being enabled when the ascertained heat quantity exceeds a predefinable heat quantity. It is advantageous to enable the method only when sufficient thermal energy has been introduced into the system. Thus, it is ensured that the temperature model and the resultant modeled heater power may be evaluated in a robust manner in order to be able to be subsequently compared with the actual measured heater power for the exhaust gas sensor.

In further aspects, the present invention relates to a device, in particular, to a control unit and to a computer program, which are configured, in particular, programmed, to carry out one of the methods of the present invention. In a still further aspect, the present invention relates to a machine-readable memory medium, on which the computer program is stored.

DETAILED DESCRIPTION OF EXAMPLE EMBODIMENTS

Figure 1:
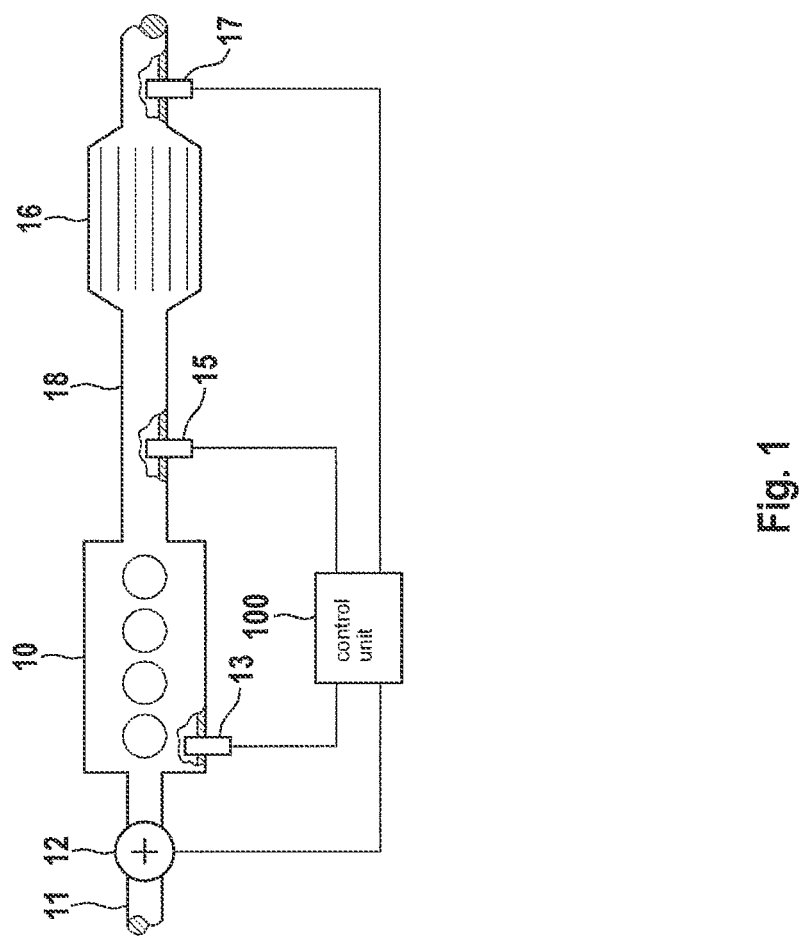
FIG. 1 schematically shows a representation of a subject lambda sensor from the related art.

FIG. 1 schematically shows by way of example of a gasoline engine the technical setting in which the method for diagnosing exhaust gas sensor 15 according to the present invention may be employed. An internal combustion engine 10 is fed air via an air inlet 11 and its mass is determined using an air-flow sensor 12. Air-flow sensor 12 may be designed as a hot film air-flow sensor. The exhaust gas of internal combustion engine 10 is discharged via an exhaust gas channel 18, an emission control system 16 being provided in the flow direction of the exhaust gas downstream from internal combustion engine 10. Emission control system 16 normally includes at least one catalytic converter.

For controlling internal combustion engine 10, a control unit 100 is provided, which carries out a fuel metering via injection valves 13 in a known manner. In addition, the signals of air-flow sensor 12 and of exhaust gas sensors 15, 17 situated in exhaust gas channel 18 are received and stored. Exhaust gas sensor 15 in the example shown determines a lambda actual value of an air-fuel mixture fed to internal combustion engine 10. It may be designed as a broadband lambda sensor or continuous lambda sensor. Exhaust gas sensor 17 determines the exhaust gas composition downstream from emission control system 16. Exhaust gas sensor 17 may be designed as a bistable sensor or a two-point lambda sensor.

Exhaust gas sensor 15 includes as the main component a measuring cell that includes an integrated heating element and a temperature sensor, which supplies an output signal as a function of the oxygen content in exhaust gas channel 18, which serves as an input signal of a lambda control. The measuring cell in this case may be designed as a Nernst cell. The lambda control is usually a component of a function in control unit 100.

The method according to the present invention is explained below as exemplified by exhaust gas sensor 15 designed as a two-point lambda sensor. This may be applied analogously also to other exhaust gas sensors that include a temperature-dependent output signal, a heating element and a temperature sensor.

One particular feature of the present invention is further represented by a temperature model for exhaust gas sensor 15, which is able to model the temperature at the point of exhaust gas sensor 15 during a heating process as a function of multiple input variables. The temperature model in this case is ascertained with the aid of control unit 100.

The temperature model in this case takes into account the heat input through the heater of exhaust gas sensor 15, as well as the external influences, such as the heat input or the heat dissipation via the exhaust gas surrounding exhaust gas sensor 15, in which exhaust gas sensor 15 is embedded.

The sensor temperature model in this case takes the external influences into account, the assumed heating power being set according to the activated heater voltage (assuming the specified heater resistance $R_i$) in relation to the heat input or the resultant sensor temperature.

Exhaust gas sensors 15, 17 each further include a means for temperature measurement (i.e., a temperature measurement element), the temperatures of exhaust gas sensors 15, 17 being received by control unit 100 where they are stored.

The sensor temperature model or temperature model is ascertained as a function of an intake air temperature, of a battery voltage, of a pulse width-modulated activation ratio of the heater of exhaust gas sensor 15, of a wall temperature at the point of exhaust gas sensor 15, of an exhaust gas temperature at the point of exhaust gas sensor 15 and of a coolant temperature $T_{coolant}$ at the output of internal combustion engine 10. The electrical heating power of exhaust gas sensor 15 results from the instantaneous battery voltage and from the pulse width-modulated activation ratio as a function of given heater resistance $R_i$. This heater resistance $R_i$ is temperature-dependent and specified for a functional exhaust gas sensor 15. As a result of, for example, ageing processes of the heater element, heater resistance $R_i$ may obtain an additional component, as a result of which the resultant heating power of exhaust gas sensor 15 is reduced. By way of this additional component, it is possible using the evaluation logic presented to distinguish between a functional and a marginal or a defective exhaust gas sensor 15.

Figure 2:
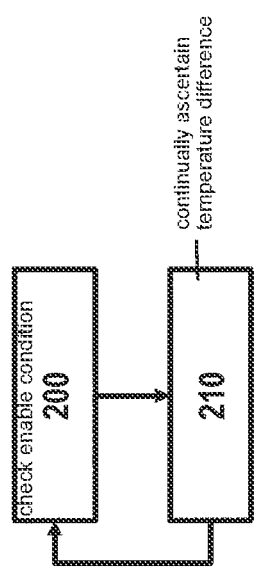
FIG. 2 shows a first exemplary embodiment of the method according to the present invention based on a flowchart.

An exemplary sequence of the method according to the present invention for diagnosing a heating element of an exhaust gas sensor 15 of an internal combustion engine 10 is shown in FIG. 2. A temperature model is stored on control unit 100, which models a temperature $T_{mod}$ at the point of exhaust gas sensor 15.

Mass flows, volume flows, temperatures of internal combustion engine 10, or temperatures of the intake air and of the exhaust gas of internal combustion engine 10, preferably temperatures ascertained upstream from exhaust gas sensor 15, for example, may be used as input signals for the temperature model. In one particularly advantageous embodiment, the temperature model is ascertained as a function of a temperature of an intake air of the internal combustion engine, of a battery voltage of the internal combustion engine, of a pulse width-modulated activation ratio for the heater of exhaust gas sensor 15, of a wall temperature at the point of exhaust gas sensor 15, of an exhaust gas temperature, of a coolant temperature $T_{coolant}$ at the output of internal combustion engine 10.

In an initial step 200, an enable condition for the method is checked.

In one first embodiment, the method for diagnosing a heating element of an exhaust gas sensor 15 of an internal combustion engine 10 is enabled when a predefinable time period $t_{wait}$ starting from the activation of the heating element of exhaust gas sensor 15 has elapsed. Time t is started with the start of the heating process in control unit 100.

If time t exceeds predefinable time period $t_{wait}$, the method is then enabled and the method is continued in step 210.

In one second embodiment, the method for diagnosing a heating element of an exhaust gas sensor 15 of an internal combustion engine 10 is enabled when a start temperature $T_{start}$ of exhaust gas sensor 15, which is ascertained at the point in time of the activation of the heater element of exhaust gas sensor 15, is exceeded by a predefinable temperature increase $S_{Temp}$. In this case, start temperature $T_{start}$ is received and stored in control unit 100 and it is continuously checked whether start temperature $T_{start}$ exceeds predefinable temperature increase $S_{Temp}$.

Temperature $T_{start}$ observed in this case is ascertained in the process preferably via the temperature model or in a sensor-based manner via the temperature sensor of exhaust gas sensor 15.

The method may then be continued in step 210.

In one third embodiment, the method for diagnosing a heating element of an exhaust gas sensor 15 of an internal combustion engine 10 is enabled when a predefinable heat quantity $w_{specification}$ is exceeded by an ascertained heat quantity $w_{Trg}$, which is started with the activation of the heater element of exhaust gas sensor 15. Starting with the activation of the heating process, heat quantity $w_{Trg}$ is continuously ascertained as a function of modeled temperature $T_{mod}$.

Heat quantity $w_{Trg}$ results in a known manner from modeled temperature difference $\Delta T_{mod}$, from specified heat capacity $c_p$ of exhaust gas sensor 15 and from mass M of exhaust gas sensor 15. The calculation and the enabling are carried out in this case by control unit 100.

Alternatively, heat quantity $w_{Trg}$ may be ascertained also based on continuously ascertained temperature $T_{sens}$ of the temperature sensor of exhaust gas sensor 15.

In one alternative embodiment, modeled heat quantity $w_{Trg}$ may be ascertained over a predefinable time period. Starting at the point in time of the activation of the heater process until, for example, a predefinable period of time has elapsed. In one alternative embodiment, the ascertainment of heat quantity $w_{Trg}$ may also be carried out via a heater power $P_{sens}$;$P_{mod}$. The heater power may be ascertained on the one hand via the temperature model or via sensor-based variables.

The method is then continued in step 210.

In one fourth embodiment, the method for diagnosing a heating element of an exhaust gas sensor 15 of an internal combustion engine 10 is enabled when an ascertained temperature $T_{Sens}$ of exhaust gas sensor 15 exceeds a predefinable operating temperature $TH_{setpoint}$.

For this purpose, temperature $T_{Sens}$ of exhaust gas sensor 15 is ascertained preferably starting from the activation of the heater process for the heater element of exhaust gas sensor 15, and when ascertained temperature $T_{Sens}$ exceeds predefinable operating temperature $TH_{setpoint}$, enablement is provided and the method is continued in step 210.

For evaluating, modeled temperature $T_{mod}$ may alternatively also be used for the enablement. If modeled temperature $T_{mod}$ exceeds predefinable operating temperature $TH_{setpoint}$, enablement is provided and the method is continued in step 210.

An operating temperature for a lambda sensor is, for example, approximately 700° C.

In a step 210, a temperature difference $Diff_T$ between modeled temperature $T_{mod}$ and ascertained temperature $T_{Sens}$ is continually ascertained upon enablement of the method by control unit 100.

If ascertained temperature difference $Diff_T$ exceeds a predefinable temperature threshold value $T_{max}$, the heating element of exhaust gas sensor 15 is recognized as defective and the method may be terminated or started again at the beginning in step 200.

Alternatively, the evaluation of temperature difference $Diff_T$ may be carried out filtered against predefinable temperature threshold value $T_{max}$, so that an exceedance of predefinable temperature threshold value $T_{max}$ by ascertained temperature difference $Diff_T$ must be present for a particular period of time before the heating element of exhaust gas sensor 15 is recognized as defective.

Figure 3:
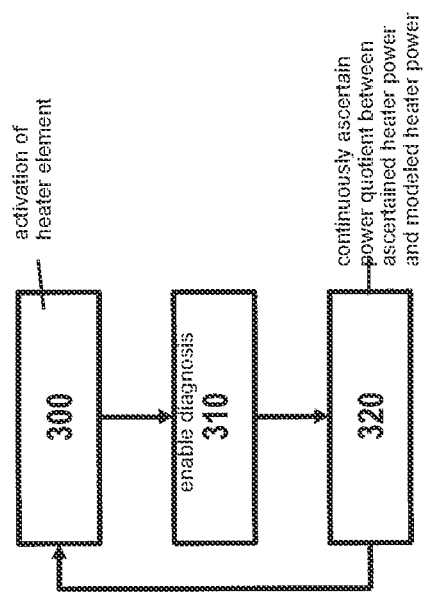
FIG. 3 shows a second exemplary embodiment of the method according to the present invention based on a flowchart.

A second exemplary sequence for the method for diagnosing a heating element of an exhaust gas sensor 15 of an internal combustion engine 10 is shown in FIG. 3. A temperature model, which models a temperature $T_{mod}$ at the point of exhaust gas sensor 15 as well as a modeled heater power $P_{mod}$, is stored on control unit 100.

With the specification of an operating temperature for exhaust gas sensor 15, an activation of the heater element of exhaust gas sensor 15 is started in a first step 300. With the activation of the heater element, the temperature of the intake air of internal combustion engine 10, the battery voltage of internal combustion engine 10, the pulse width-modulated activation ratio for the heater of exhaust gas sensor 15, the wall temperature at the point of exhaust gas sensor 15, the exhaust gas temperature and the coolant temperature $T_{coolant}$ at the output of internal combustion engine 10 are also continuously received and stored by control unit 100. A heater power $P_{sens}$ is ascertained by control unit 100 as a function of ascertained temperature $T_{Sens}$ of the battery voltage and of the pulse width-modulated activation signal for the heater.

A modeled heater power $P_{mod}$ is also ascertained via the temperature model based on ascertained temperature $T_{Sens}$.

The method is then continued in step 310.

With the start of the activation of the heater element of exhaust gas sensor 15, an enablement of the diagnosis of the heating element of an exhaust gas sensor 15 is started in step 310. In one first embodiment, the method for diagnosing a heating element of an exhaust gas sensor 15 of an internal combustion engine 10 is enabled when a predefinable time period $t_{wait}$ starting from the activation of the heating element of exhaust gas sensor 15 has elapsed. Time t is started with the start of the heating process in control unit 100.

If time t exceeds predefinable time period $t_{wait}$, then the method is enabled and the method is continued in step 320.

In one alternative embodiment, the method for diagnosing a heating element of an exhaust gas sensor 15 of an internal combustion engine 10 is enabled when a predefinable heat quantity $W_{specification}$ is exceeded by an ascertained heat quantity $w_{Trg}$, which is started with the activation of the heater element of exhaust gas sensor 15. Starting with the activation of the heating process, heat quantity $w_{Trg}$ is continuously ascertained as a function of measured temperature $T_{Sens}$ and/or of modeled temperature $T_{mod}$.

Heat quantity $w_{Trg}$ results in a known manner from temperature difference $\Delta T_{mod}$, from specific heat capacity $c_p$ of exhaust gas sensor 15 and from mass M of exhaust gas sensor 15.

The calculation and the enablement in this case are carried out by control unit 100.

Alternatively, heat quantity $w_{Trg}$ may be ascertained also based on continuously ascertained temperature $T_{Sens}$ of the temperature sensor of exhaust gas sensor 15.

In one alternative embodiment, modeled heat quantity $w_{Trg}$ may be ascertained over a predefinable time period. Starting at the point in time of the activation of the heater process until, for example, a predefinable period of time has elapsed. In one alternative embodiment, the ascertainment of heat quantity $w_{Trg}$ may also be carried out via a heater power $P_{sens}$;$P_{mod}$. The heater power may be ascertained on the one hand via the temperature model or via sensor-based variables.

The method may then be continued in step 320.

In a step 320, a power quotient $Q_P$ between ascertained heater power $P_{Sens}$ and modeled heater power $P_{mod}$ is continuously ascertained by control unit 100 upon enablement of the method. If ascertained power quotient $Q_P$ exceeds a predefinable power threshold value $S_Q$, the heating element of exhaust gas sensor 15 is recognized as defective and the method is terminated or started again at the beginning in step 300.

The monitoring of power quotient $Q_P$ is based on the idea that power quotient $Q_P$ in the case of a functional heater element of exhaust gas sensor 15 is close to the value one.

For a defective heating element of exhaust gas sensor 15, the actual required heater power $P_{Sens}$ would always be greater than heater power $P_{mod}$ modeled based on the temperature model for a functional heater element of exhaust gas sensor 15.

If the heating power of the heater element of exhaust gas sensor 15 is limited, for example, by a defect, then the heater element must provide more heater energy in contrast to a heater element of a functional exhaust gas sensor, in order, for example, to reach a predefinable operating temperature or in order to maintain this operating temperature.

As a result of the continuous comparison of heater power $P_{Sens}$ with modeled heater power $P_{mod}$, it thus possible to carry out a diagnosis of the heater element of exhaust gas sensor 15 in a robust manner.

If values greater than one result for power quotient $Q_P$, then it must be assumed that the heating element of exhaust gas sensor 15 is severely limited in its efficiency or is even defective.

Alternatively, the evaluation of power quotient $Q_P$ may be carried out filtered against predefinable power threshold value $S_Q$, so that an exceedance of predefinable power threshold value $S_Q$ by ascertained power quotient $Q_P$ must be present for a particular period of time before the heating element of exhaust gas sensor 15 is recognized as defective. The method may then be terminated or started from the beginning in step 300.

What is claimed is:

1. A method for diagnosing a heating element of an exhaust gas sensor of an engine system that includes an internal combustion engine, the method comprising the following steps:
    while a temperature at the exhaust gas sensor is at a start temperature value, operating the heating element to initiate a heating process that increases the temperature of the exhaust gas sensor in order to attain an enable condition; and
    based on reaching the enable condition due to the heating process:
        identifying a current actual temperature value of the temperature at the exhaust gas sensor using a temperature sensor and identifying a modeled expected temperature value of the temperature at the exhaust gas sensor based on a present state of the engine system that is dependent on operating conditions of the engine system, wherein the present state is determined based on one or more sensor output;
        ascertaining a temperature difference between the modeled expected temperature value of the temperature at the exhaust gas sensor and the identified current actual temperature value of the temperature at the exhaust gas sensor; and
        diagnosing the heating element of the exhaust gas sensor as defective when the ascertained temperature difference exceeds a predefinable temperature threshold value;
    wherein the method includes at least one of the following three features (I)-(III):
        (I) the method further comprises ascertaining a heat quantity introduced by the heating process, the ascertainment being performed as a function of a model according to which the modeled expected temperature value is identified, the enable condition being determined to be reached when the ascertained heat quantity exceeds a predefinable heat quantity;
        (II) a setpoint temperature value for the heating process is predefined, the enable condition being determined to be reached at a point in time when the modeled expected temperature value reaches or exceeds the predefined setpoint temperature value, an actual value of the temperature coinciding with the point in time being selected as the current actual temperature value based on the enable condition being reached; and
        (III) the modeled expected temperature value is ascertained as a function of a temperature of an intake air of the internal combustion engine, of a battery voltage of the internal combustion engine, of a pulse width-modulated activation ratio for the heating element of the exhaust gas sensor, of a wall temperature at the point of the exhaust gas sensor, of an exhaust gas temperature, and of a coolant temperature at the output of an internal combustion engine.

2. A method for diagnosing a heating element of an exhaust gas sensor of an internal combustion engine, the exhaust gas sensor including a temperature measurement element, the method comprising the following steps:
    continuously ascertaining a modeled temperature at a point of the exhaust gas sensor using a temperature model;
    increasing the temperature of the exhaust gas sensor by a heating process;
    ascertaining a start temperature with a start of the heating process, wherein an enable condition being attained upon exceedance of the start temperature by a predefinable temperature increase;
    upon attaining the enable condition, ascertaining a temperature difference between the modeled temperature of the exhaust gas sensor and a measured temperature of the exhaust gas sensor; and
    recognizing the heating element of the exhaust gas sensor as defective when the ascertained temperature difference exceeds a predefinable temperature threshold value.

3. The method as recited in claim 2, wherein the start temperature is ascertained in a sensor-based or model-based manner.

4. The method as recited in claim 1, wherein the enable condition is determined to be reached as a function of a predefinable time period after a start of the heating process.

5. The method as recited in claim 1, a further comprising the ascertaining of the heat quantity introduced by the heating process, the ascertainment being performed as a function of the model according to which the modeled expected temperature value is identified, the enable condition being determined to be reached when the ascertained heat quantity exceeds the predefinable heat quantity.

6. The method as recited in claim 1, wherein the setpoint temperature value for the heating process is predefined, the enable condition being determined to be reached at the point in time when the modeled expected temperature value reaches or exceeds the predefined setpoint temperature value, the actual value of the temperature coinciding with the point in time being selected as the current actual temperature value based on the enable condition being reached.

7. The method as recited in claim 1, wherein the modeled expected temperature value is ascertained as a function of the temperature of the intake air of the internal combustion engine, of the battery voltage of the internal combustion engine, of the pulse width-modulated activation ratio for the heating element of the exhaust gas sensor, of the wall temperature at the point of the exhaust gas sensor, of the exhaust gas temperature, and of the coolant temperature at the output of the internal combustion engine.

8. The method as recited in claim 1, wherein the heating element is integrated into the exhaust gas sensor.

9. A non-transitory machine-readable memory medium on which is stored a computer program for diagnosing a heating element of an exhaust gas sensor of an engine system that includes an internal combustion engine, the computer program, when executed by a computer, causing the computer to perform a method, the method comprising the following steps:
    while a temperature at the exhaust gas sensor is at a start temperature value, operating the heating element to initiate a heating process that increases the temperature of the exhaust gas sensor in order to attain an enable condition; and based on reaching the enable condition due to the heating process:
  identifying a current actual temperature value of the temperature at the exhaust gas sensor using a temperature sensor and identifying a modeled expected temperature value of the temperature at the exhaust gas sensor based on a present state of the engine system that is dependent on operating conditions of the engine system, wherein the present state is determined based on one or more sensor output;
  ascertaining a temperature difference between the modeled expected temperature value of the temperature at the exhaust gas sensor and the identified current actual temperature value of the temperature at the exhaust gas sensor; and
  diagnosing the heating element of the exhaust gas sensor as defective when the ascertained temperature difference exceeds a predefinable temperature threshold value;

wherein the method includes at least one of the following four features (I)-(IV):
  (I) the method further comprises identifying the start temperature value with a start of the heating process, the enable condition being attained upon exceedance of the start temperature value by a predefinable temperature increase;
  (II) the method further comprises ascertaining a heat quantity introduced by the heating process, the ascertainment being performed as a function of a model according to which the modeled expected temperature value is identified, the enable condition being determined to be reached when the ascertained heat quantity exceeds a predefinable heat quantity;
  (III) a setpoint temperature value for the heating process is predefined, the enable condition being determined to be reached at a point in time when the modeled expected temperature value reaches or exceeds the predefined setpoint temperature value, an actual value of the temperature coinciding with the point in time being selected as the current actual temperature value based on the enable condition being reached; and
  (IV) the modeled expected temperature value is ascertained as a function of a temperature of an intake air of the internal combustion engine, of a battery voltage of the internal combustion engine, of a pulse width-modulated activation ratio for the heating element of the exhaust gas sensor, of a wall temperature at the point of the exhaust gas sensor, of an exhaust gas temperature, and of a coolant temperature at the output of an internal combustion engine.

10. An electronic control unit configured to diagnose a heating element of an exhaust gas sensor of an engine systme that includes an internal combustion engine, the electronic control unit configured to perform a method, the method including the following steps:

while a temperature at the exhaust gas sensor is at a start temperature value, operating the heating element to initiate a heating process that increases the temperature of the exhaust gas sensor in order to attain an enable condition; and based on reaching the enable condition due to the heating process:
  identifying a current actual temperature value of the temperature at the exhaust gas sensor using a temperature sensor and identifying a modeled expected temperature value of the temperature at the exhaust gas sensor based on a present state of the engine system that is dependent on operating conditions of the engine system, wherein the present state is determined based on one or more sensor output;
  ascertaining a temperature difference between the modeled expected temperature value of the temperature at the exhaust gas sensor and the identified current actual temperature value of the temperature at the exhaust gas sensor; and
  diagnosing the heating element of the exhaust gas sensor as defective when the ascertained temperature difference exceeds a predefinable temperature threshold value;

wherein the method includes at least one of the following four features (I)-(IV):
  (I) the method further comprises identifying the start temperature value with a start of the heating process, the enable condition being attained upon exceedance of the start temperature value by a predefinable temperature increase;
  (II) the method further comprises ascertaining a heat quantity introduced by the heating process, the ascertainment being performed as a function of a model according to which the modeled expected temperature value is identified, the enable condition being determined to be reached when the ascertained heat quantity exceeds a predefinable heat quantity;
  (III) a setpoint temperature value for the heating process is predefined, the enable condition being determined to be reached at a point in time when the modeled expected temperature value reaches or exceeds the predefined setpoint temperature value, an actual value of the temperature coinciding with the point in time being selected as the current actual temperature value based on the enable condition being reached; and
  (IV) the modeled expected temperature value is ascertained as a function of a temperature of an intake air of the internal combustion engine, of a battery voltage of the internal combustion engine, of a pulse width-modulated activation ratio for the heating element of the exhaust gas sensor, of a wall temperature at the point of the exhaust gas sensor, of an exhaust gas temperature, and of a coolant temperature at the output of an internal combustion engine.

* * * * *